United States Patent [19]

Moore

[11] 4,046,113

[45] Sept. 6, 1977

[54] INTERNAL COMBUSTION ENGINE FUEL INJECTION CONTROL SYSTEM

[75] Inventor: John Howard Moore, Redditch, England

[73] Assignee: The Lucas Electrical Company Limited, Birmingham, England

[21] Appl. No.: 655,657

[22] Filed: Feb. 5, 1976

[30] Foreign Application Priority Data

Feb. 12, 1975  United Kingdom .................. 5884/75

[51] Int. Cl.² .............................................. F02B 3/00
[52] U.S. Cl. ............................ 123/32 EA; 123/139 E
[58] Field of Search ...................... 123/32 EA, 139 E; 73/194 F, 194 M; 338/35; 236/44 E

[56] References Cited

U.S. PATENT DOCUMENTS

| 3,523,244 | 8/1970 | Goodman et al. ..................... 338/35 |
| 3,732,854 | 5/1973 | Murtin ................................ 73/194 F |
| 3,810,389 | 5/1974 | Jason ..................................... 338/35 |
| 3,831,563 | 8/1974 | Bittain et al. ..................... 123/139 E |
| 3,898,882 | 8/1975 | Prokopius ........................ 73/194 M |

Primary Examiner—Samuel Feinberg
Attorney, Agent, or Firm—Ladas, Parry, Von Gehr, Goldsmith & Deschamps

[57] ABSTRACT

An i.c. engine fuel injection control includes a corona-discharge type transducer for measuring the mass of air aspirated by the engine. Since such a transducer is humidity sensitive a compensation circuit is provided for automatically applying a humidity correction to the control circuit which is used to control the quantity of fuel injected as a function of the transducer output. This control circuit includes an integrator to which the transducer output is periodically applied and a current source which periodically discharges the integrator, the time taken to discharge determining the quantity of fuel injected. The current source is controlled by the humidity sensitive means, to obtain the required compensation.

7 Claims, 6 Drawing Figures

PHASE DETECTOR

INTERNAL COMBUSTION ENGINE FUEL INJECTION CONTROL SYSTEM

This invention relates to internal combustion engine fuel injection control systems incorporating corona discharge type air mass flow transducers.

An internal combustion engine fuel injection system in accordance with the invention comprises a corona discharge type air mass flow transducer together with an injection control circuit controlled by the output of said transducer for regulating the rate at which fuel is injected into the engine, and means sensitive to the humidity of air aspirated into the engine for modifying the fuel injection rate in accordance with humidity.

Preferably the injection control circuit includes an integrator to which the output of said transducer is periodically applied for a period corresponding to a fixed engine crankshaft angle. The output of the integrator at the end of said period is then dependent on the total mass of air aspirated during that period.

The injection control circuit preferably also includes a controlled current source through which the integrator is discharged periodically, the length of time taken for such discharge determining the quantity of fuel to be injected. In an preferred embodiment of the invention the humidity sensitive means control said current source to obtain the required humidity/fuel injection rate characteristic.

Figure 1:
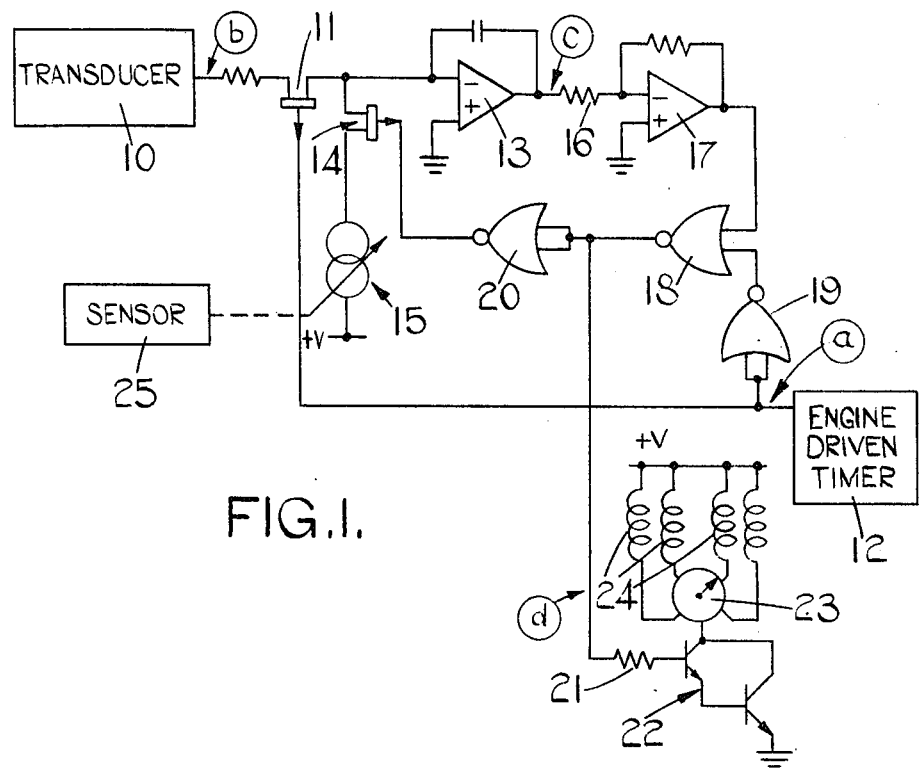
FIG. 1 is a schematic circuit diagram of one example of a system in accordance with the invention.

In FIG. 1 the circuit shown includes a transducer 10 which is of the type described in detail in our co-pending application No. 655,656 filed Feb. 5, 1976 and which has its electrodes mounted in the air intake manifold of an internal combustion engine. The output terminal of the transducer is connected to an F.E.T. series switch 11 which has its gate terminal connected to an engine driven timer pulse generator 12. The bias components of the switch 11 are omitted for clarity. The output terminal of the switch 11 is connected to the invert input terminal of an operational amplifier 13 connected as an integrator and also to a F.E.T. shunt switch 14 which shunts the invert input terminal of the operational amplifier 13 via an adjustable constant current source 15 controlled by a humidity sensitive control circuit 25.

Figure 2:
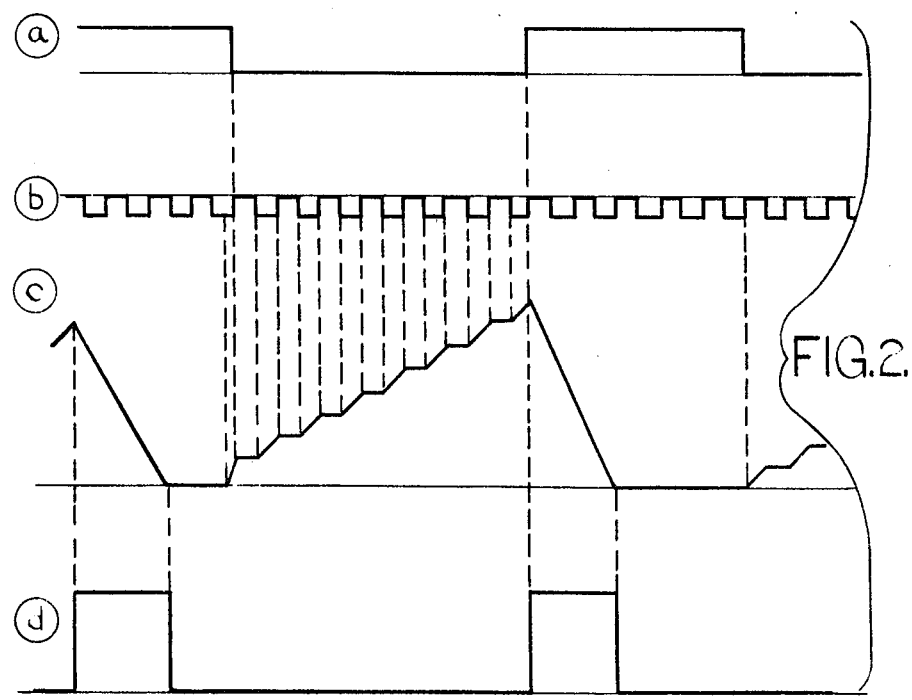
FIG. 2 is a set of graphs showing voltage waveforms at various points in FIG. 1.

As shown in FIG. 2, the generator 12 produces pulses which operate the switch 11. When the switch 11 is conductive the pulses from the transducer 10 pass to the integrator operational amplifier 13 so that the output voltage builds up to a level dependent on the magnitude of the d.c. level of these pulses and the length of time for which the switch 11 is conductive. The final output voltage is proportional to the mass of air aspirated during this length of time (which corresponds to a fixed angle of rotation of the engine crankshaft). Note that if there is a reversal of flow in the intake manifold at any time during the integrating period, the pulses from the transducer 10 will be positive-going and the integral will be appropriately reduced.

With the switch 11 non-conductive and the switch 14 conductive a constant current (dependent on the adjustment of the source 15) will be fed to the integrator input and its output will thus reduce at a constant ramp rate (likewise dependent on the adjustment of the source 15).

The output terminal of the integrator operational amplifier is connected via a resistor 16 to the invert input terminal of an operational amplifier 17, connected to operate as a high gain inverting amplifier.

The output terminal of the amplifier 17 is connected to one input terminal of a NOR gate 18 the other input terminal of which is connected to the output terminal of a NOR gate 19 which has both its input terminals connected to the generator 12. The output terminal of the gate 18 is connected to both input terminals of a NOR gate 20 the output terminal of which is connected to the gate of the F.E.T. switch 14. The output terminal of the gate 18 is also connected via a resistor 21 to the base of a Darlington pair 22 the emitter of which is grounded and the collector of which is connected via a distributor 23 to the injector solenoid 24.

At the end of a pulse from the generator 12, the switch 11 becomes conductive and switch 14 is non-conductive so that the integrator 13 integrates the incoming pulses from the transducer 10 until the commencement of the next pulse from the generator 12. The output of the integrator is detected by the amplifier 17 and prevents gate 18 from producing an output. Thus, when the pulse from the generator 12 starts, the gate 19 will produce an output which switches on the Darlington pair 22 to energize whichever of the solenoids 24 is connected thereto by the distributor 23. Simultaneously, the switch 11 will become non-conductive and the switch 14 will become conductive. When the output of the integrator 13 becomes negative the gate 18 will produce an output blocking gate 19 and thereby switching off the Darlington pair 22 and the switch 14. The circuit now remains quiescent until the pulse from the generator 12 terminates when the cycle described recommences.

Figure 3:
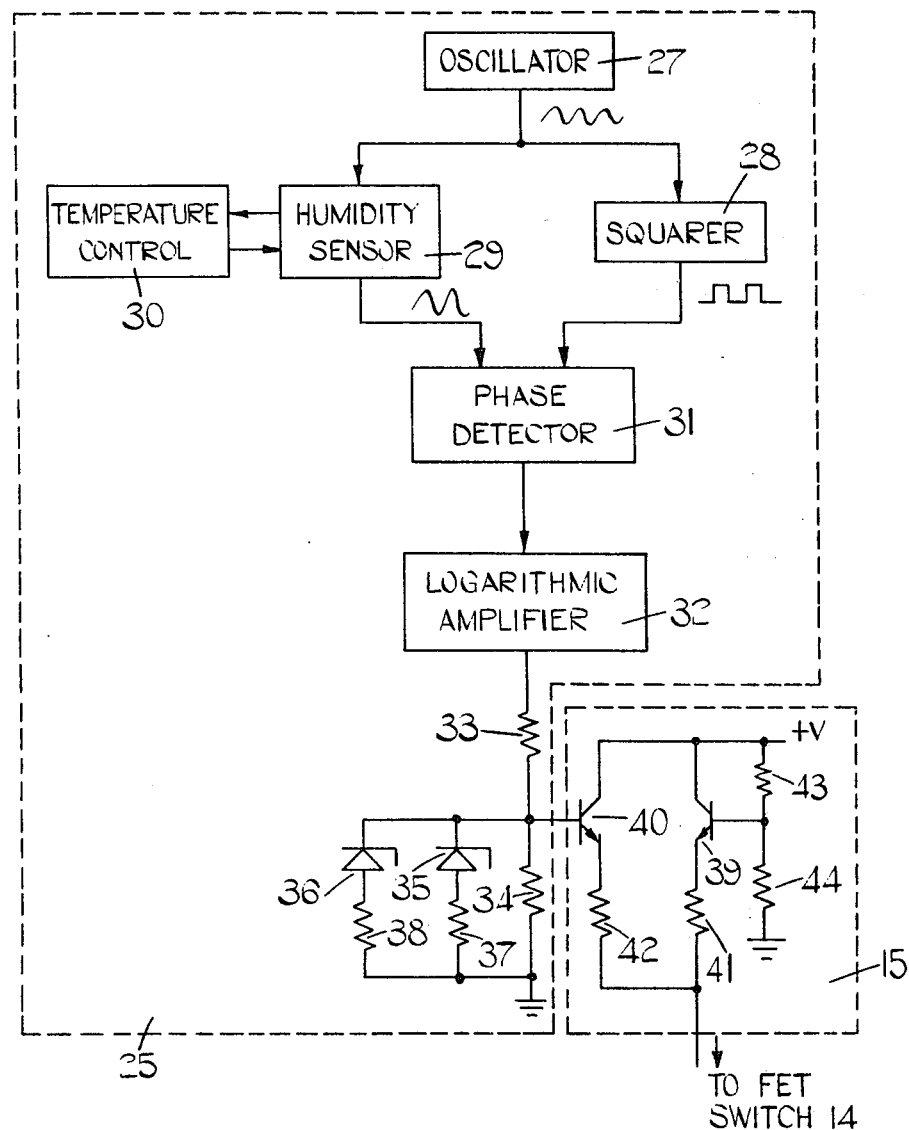
FIG. 3 is a schematic diagram of an humidity-controlled current source forming part of the circuit shown in FIG. 1, and FIGS. 4 to 6 are circuit diagrams of various parts of the circuit shown in FIG. 3.

The controlled current source 15 and its associated humidity sensitive control circuit 25 are shown schematically in FIG. 3. This arrangement is used because the mass flow transducer 10 is, in fact, humidity sensitive. When such transducers are used in scientific instrumentation they are usually employed with a conversion table to enable the mass flow reading obtained to be connected to take account of the prevailing humidity which must be measured separately. Clearly this situation is not satisfactory for an engine fuel control system.

The humidity compensation circuit 25 comprises an oscillator 27 which produces a sinusoidal output signal which is applied to a squarer circuit 28 which produces a square wave output substantially in phase with the sinusoidal output of the oscillator. The sinusoidal outout of the oscillator is also applied to a humidity sensor 29. This sensor 29 consists basically of an aluminum strip substrate anodized on one side to provide an aluminum oxide layer about 20μm thick. A vacuum deposited porous gold layer overlies the oxide layer. The temperature of the substrate is controlled by means of an interdigitated array of nickel temperature sensing elements and nickel heating elements attached to the opposite side of the aluminum strip. The sensing and heating elements are connected to a temperature control 30. A humidity sensor as above described is available from H.

Tinsley & Company Limited, who market it as their Torry Hygrometer Probe, Type 5809. Such a sensor measures water vapor partial pressure, which, over the small pressure range to which the sensor is here being subjected, is an adequate representation of humidity as expressed as percent by weight.

The sensor described has a parallel conductance and a parallel capacitance between the substrate and the gold layer, both of which parameters vary as functions of humidity. In the present case the parallel conductance is measured and used as the control parameter. To this end the sinusoidal signal referred to is passed through the sensor and it is ensured that there is a minimal d.c. level across the aluminum oxide layer to avoid polarization. It is found that there is a good linear relationship between the log of the parallel conductance $G_p$ and the vapor pressure.

The signals from the sensor and the squarer are applied to a phase detector circuit 31, the output of which is a voltage signal proportional to the parallel conductance $G_p$ of the sensor. To obtain a humidity signal the output of the phase detector 31 is applied to a log amplifier 32.

The output of the logarithmic amplifier 32 is connected via two resistors 33 and 34 in series to earth with the cathode of two zener diodes 35, 36 having different breakdown voltages connected to the common point of these resistors. Each zener diode 35, 36 has its anode connected to earth via an associated resistor 37 or 38. Clearly, as the output of the amplifier 32 (which varies linearly with humidity) increases, the resistor 34 alone is in circuit at low voltage, so that the voltage at the common point of the resistors 33, 34 rises relatively steeply. When the voltage at this common point reaches the breakdown voltage of the zener diode 35, the resistor 37 is put in parallel with the resistor 34, so that the voltage now rises less steeply. Finally when the zener diode 36 breaks down all three resistors 34, 37 and 38 will be in parallel and the rate of rise of the voltage at the common point will be relatively shallow.

The current source 15 includes two n-p-n transistors 39 and 40, the emitters of which are connected via resistors 41, 42 respectively to the F.E.T. switch 14. When the switch 14 is on these resistors are effectively earthed (since the integrator 13 operates in the virtual earth mode). The transistor 39 has a potential divider bias network 43, 44 so that it provides a constant current to the F.E.T. switch 14 when the latter is on. The other transistor 40 has its base connected to the common point of the resistors 33, 34 so that the current it passes is directly proportional to the voltage at this common point (less the $V_{be}$ of transistor 40). Thus the total current passed to the integrator is at a level set by the components associated with transistor 39 when the output of the amplifier 32 is zero, rises steeply initially with increasing output from the amplifier 32 and progressively less steeply as the zener diodes 35, 36 progressively break down.

Such a current characteristic provides compensation for the variations in the output of the transducer 10 which result from humidity variations, so that the output pulse length of the control circuit becomes independent of the humidity of the aspirated air.

Figure 4:
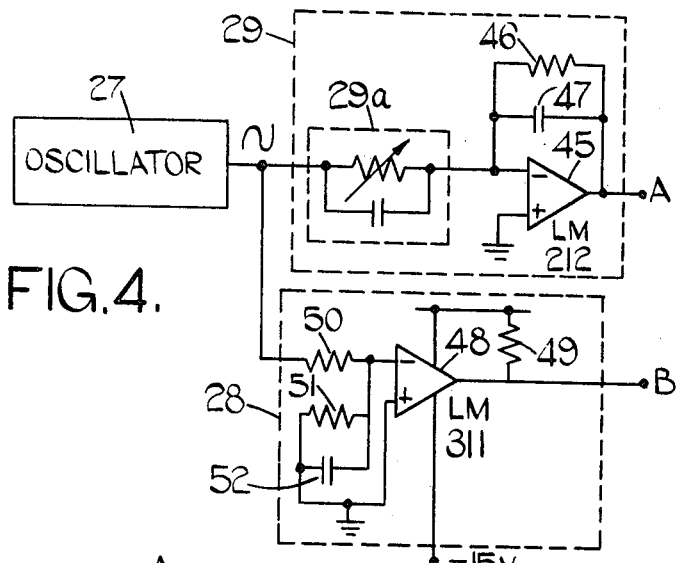

Turning now to FIG. 4, there is shown therein more detail of the squarer 29 and humidity sensor circuits 28. The sensor element 29a in fact connects the oscillator output to the inverting input terminal of an operational amplifier 45 connected as an integrator. The non-inverting input terminal of the amplifier 45 is grounded and its output terminal is connected back to its input terminal by a resistor 46 and capacitor 47 in parallel.

The squarer 28 consists of a voltage comparator 48 having its non-inverting input terminal grounded and its output terminal connected by a resistor 49 to the $V_{cc}$ rail (at +15V). The inverting input terminal of the amplifier 27 is connected by a resistor 50 to the oscillator output terminal, and also, via a resistor 51 and capacitor 52 in parallel to ground.

Figure 5:
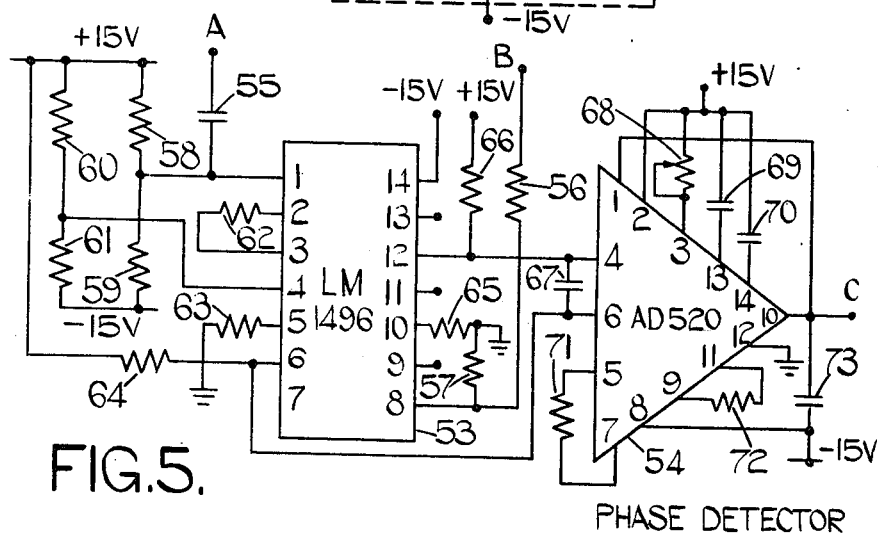

FIG. 5 shows the phase detector 31 which includes an integrated circuit balanced modulator/demodulator device 53 type LM1496 (manufactured by National Semiconductor) and a low drift differential amplifier 54 type AD520 (manufactured by Analog Devices). The two inputs to the device 53 are applied to pins 1 and 8 of the integrated circuit, the output of amplifier 45 being coupled by a capacitor 55 to pin 1 and the output of the amplifier 48 being coupled by a resistor 56 to pin 8. A resistor 57 connects pin 8 to ground and a resistive potential divider 58, 59 connected between the +15V and −15V rails has its common point connected to pin 1 to provide the required bias. A further potential divider 60, 61 between the ±15V rails has its common point connected to pin 4 and pins 2 and 3 are interconnected by a resistor 62. Pin 5 is grounded via a resistor 63 and pin 6 is connected by a load resistor 64 to the +15V rail and also to one input terminal (pin 6) of the differential amplifier. Pin 10 is grounded via a resistor 65 and pin 12 is connected by a load resistor 66 to the +15V rail and is also connected to the other input terminal (pin 4) of the differential amplifier 54. Pin 14 is connected to the −15V rail and pins 9, 11 and 13 are left open circuit. The device 53 operates to provide an output voltage between pins 6 and 12 which is effectively a product of the input voltages applied at pins 1 and 8. Thus if the two input signals exactly are in phase or 180° out of phase (one being square and the other sinusoidal) the differential output will be a full wave rectified signal and if they are 90° out of phase the differential output will be a waveform which is symmetrical about $\Delta V=0$. Thus there is a d.c. component in the differential output signal which is a positive maximum when the signals are in phase, zero when the phase difference is 90° and a negative maximum when the signals are 180° out of phase. A capacitor 67 connected across pins 6 and 12 removes the a.c. component and leaves this d.c. component, whose amplitude is proportional to the conductance of the sensor 19a.

The differential amplifier device 53 has pins 1 and 10 connected to the output terminal C, pin 3 connected via a variable resistor 68 to the +15V rail, pins 13 and 14 connected via capacitors 69 and 70 to the +15V rail and pin 2 connected directly to the +15V rail. Pin 5 is connected to pin 7 by a resistor 71 and pins 9 and 11 are likewise interconnected by a resistor 72. Pin 8 is connected to the −15V rail and a capacitor 73 connects the output terminal C to the −15V rail.

Figure 6:
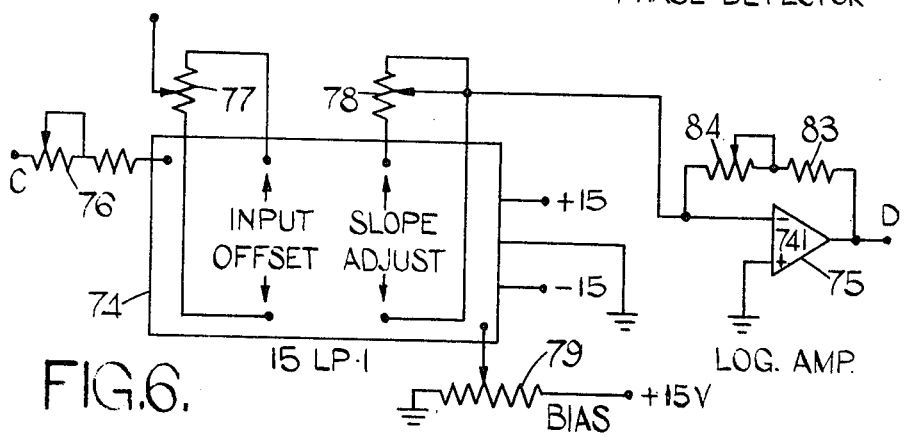

Turning now to FIG. 6, the log amplifier includes a commercially available module 74 type 15 LP-1 (manufactured by Ancom) and an operational amplifier 75 connected to apply gain and zero offset as required. Four variable resistors 76, 77, 78 and 79 are used in conjuncton with the module 74, resistor 76 being used to couple the output of amplifier 54 to the input of the module. The resistor 77 is connected as a potentiometer between two input offset adjustment terminals of the module and has its variable point connected to the +15V rail. The resistor 78 is connected as a variable resistor between two output terminals of the module and its variable point is the output terminal of this part of the circuit. The resistor 79 provides bias adjustment and is connected between the +15V rail and ground with its variable point connected to a bias terminal of the module.

The variable point of resistor 78 is connected by a resistor 80 to the inverting input terminal of the amplifier 75, the non-inverting input terminal of which is grounded. The inverting input terminal is also connected to the +15V rail by a resistor 81 and a variable resistor 82 in series. Feedback from the output terminal D to the inverting input terminal is provided by a resistor 83 and a variable resistor 84 in series.

As explained above the humidity sensitive circuit 25 controls the current source 15 to ensure that the humidity dependence of the transducer 10 is compensated for. Thus the pulse length produced in each cycle of operation is made directly proportional to the total mass of gas aspirated during the measuring period prior to each injection operation. In this way the air fuel ratio is kept very accurately constant for all engine speeds and throttle opening conditions. This enables the engine to operate at optimum efficiency and enables noxious exhaust emissions to be minimized.

I claim:

1. An internal combustion engine fuel injection control system comprising a corona-discharge type air mass flow transducer, together with an injection control circuit and means sensitive to the humidity of air aspirated into the engine, said injection control circuit including a first circuit part which is responsive to the output of the transducer to generate a control signal and a second circuit part which is sensitive to said control signal and to the output of the humidity sensitive means to generate a signal dependent on the humidity of air aspirated into the engine.

2. A system as claimed in claim 1 in which the injection control circuit includes an integrator periodically connected to the output of the transducer for a period corresponding to a fixed engine crankshaft rotation angle, so that the output of the integrator at the end of said period is dependent on the total mass of air aspirated during said period.

3. A system as claimed in claim 2 in which the injection control circuit also includes a controlled current source through which the integrator is discharged periodically, the length of time taken for such discharge determining the quantity of fuel injected.

4. A system as claimed in claim 3 in which said humidity sensitive means is connected to said controlled current source so that the output of the integrator at the end of each said first period is humidity dependent, but dependence of the discharge time is removed by control of said current source.

5. A system as claimed in claim 4 in which said humidity sensitive means comprises a humidity sensitive element, an electronic circuit to which said element is connected and which produces an output proportional to humidity, and a function generator interposed between said electronic circuit and the current source to allow the current source humidity characteristic to be matched to the transducer humidity characteristic.

6. A system as claimed in claim 5 in which said sensing element comprises an aluminum oxide layer interposed between a substrate, a porous electrode, and means controlling the temperature of said substrate, the logarithm of the parallel conductance of said oxide layer varying linearly with the humidity.

7. A system as claimed in claim 6 in which the electronic circuit includes an oscillator means for comparing the phase of the oscillator with the phase of a signal derived by applying the oscillator output to the sensing element and producing a d.c. output dependent on the phase difference and a logarithmic amplifier connected to amplify said d.c. output to produce an output varying linearly with the humidity.

* * * * *